United States Patent [19]
York et al.

[11] Patent Number: 5,543,676
[45] Date of Patent: Aug. 6, 1996

[54] ROTATING ELECTRICAL MACHINE WITH MAGNETIC INSERTS

[75] Inventors: Michael T. York, Whitmore Lake; Richard K. Harris, Walled Lake, both of Mich.

[73] Assignee: Ford Motor Company, Dearborn, Mich.

[21] Appl. No.: 405,102

[22] Filed: Mar. 16, 1995

[51] Int. Cl.$^6$ .................................................. H02K 1/22
[52] U.S. Cl. .................. 310/263; 310/152; 310/156; 310/270; 310/154
[58] Field of Search ........................ 310/59, 65, 61, 310/192, 156, 216, 231, 43, 44, 67 R, 235, 263, 214, 270; 74/574

[56] References Cited

U.S. PATENT DOCUMENTS

| | | | |
|---|---|---|---|
| 3,346,749 | 10/1967 | Shafranek | 310/263 |
| 3,411,027 | 11/1968 | Rosenberg | 310/152 |
| 3,555,327 | 1/1971 | Terry | 310/168 |
| 4,584,496 | 4/1986 | Frister | 310/60 R |
| 4,882,515 | 11/1989 | Radomski | 310/263 |
| 4,959,577 | 9/1990 | Radomski | 310/263 |
| 4,972,114 | 11/1990 | Frister | 310/263 |
| 4,980,595 | 12/1990 | Arora | 310/263 |
| 5,047,680 | 9/1991 | Torok | 310/156 |
| 5,130,595 | 7/1992 | Arora | 310/268 |
| 5,132,581 | 7/1992 | Kusase | 310/263 |
| 5,177,391 | 1/1993 | Kusase | 310/263 |
| 5,382,862 | 1/1995 | Ward et al. | 310/263 |

*Primary Examiner*—Thomas M. Dougherty
*Assistant Examiner*—Elvin G. Enad
*Attorney, Agent, or Firm*—Mark S. Sparschu; Roger L. May

[57] ABSTRACT

In one embodiment of the present invention, a rotor of a "claw pole" alternator includes first and second pole pieces with intermeshing fingers. Magnetic inserts are provided made preferably of permanent magnet material. Each insert extends under the end of a pole finger of the rotor and has two surfaces which face radially outward from the rotor. The resulting design provides improved power output and reduced acoustic noise when compared with conventional alternators, in a design which is durable and amenable to mass production.

14 Claims, 2 Drawing Sheets

5,543,676

ROTATING ELECTRICAL MACHINE WITH MAGNETIC INSERTS

BACKGROUND OF THE INVENTION

1. Field of the Invention

The present invention relates to rotating electrical machines.

2. Description of the Related Art

Increasingly demanding requirements are continually placed on alternators used in automobiles. The combination of increased electrical power demand and generally smaller vehicles creates the demand for greater electrical power output without a greatly increased size of the alternator. Another demand is for reduced acoustic noise from the alternator. In particular, air flow through the rotor of the alternator can produce bothersome acoustic noise when the rotor rotates.

One way to meet the need for increased power output from an alternator is described in U.S. Pat. No. 4,959,577, issued to Radomski. In this patent, permanent magnets are installed between the pole fingers of an alternator. While this method may provide some advantages in terms of increased power output, other concepts could potentially provide more substantial advantage. Further, other configurations may be more amenable to mass production. Also, other configurations may be able to provide increased power output while additionally reducing the airflow-caused acoustic noise discussed above. Finally, other configurations may be more robust, in terms of surviving high-speed rotation of the alternator rotor and the harsh underhood environment (including vibration) found in automobiles.

As a result, an alternator design which provides increased power output and reduced acoustic noise over conventional designs and which does so in a way that is durable and amenable to mass production will provide advantages over the prior art.

SUMMARY OF THE INVENTION

The present invention provides a rotor for an electrical machine. The rotor comprises a first pole piece having a body defining an axis of rotation, and a plurality of pole fingers each having an axially-extending portion terminating in an end. The rotor further includes a second pole piece further having a body defining an axis of rotation coincident with the axis of the first pole piece, and a plurality of pole fingers each having an axially-extending portion terminating in an end. The pole fingers of the first pole piece intermesh with the pole fingers of the second pole piece. The rotor also comprises a plurality of magnets, each extending under an end of a finger of a pole piece and in contact with the finger, the magnets each having at least one surface facing radially outward from the rotor.

The present invention also provides another rotor for an electrical machine. The rotor comprises a first pole piece having a body defining an axis of rotation, and a plurality of pole fingers each having an axially-extending portion terminating in an end. The rotor further comprises a second pole piece further having a body defining an axis of rotation coincident with the axis of the first pole piece, and a plurality of pole fingers each having an axially-extending portion terminating in an end. The pole fingers of the first pole piece are intermeshed with the pole fingers of the second pole piece. Also, the rotor includes a plurality of permanent magnets, each having at least a portion thereof disposed under an end of a finger of a said pole piece and in contact with the finger.

Also, the present invention provides yet another rotor for an electrical machine. The rotor includes a first pole piece having a body defining an axis of rotation, and a plurality of pole fingers each having an axially-extending portion. The rotor further comprises a second pole piece having a body defining an axis of rotation coincident with the axis of the first pole piece, and a plurality of pole fingers each having an axially-extending portion, the pole fingers of the first pole piece intermeshed with the pole fingers of the second pole piece. Additionally, the rotor comprises a plurality of permanent magnets, each permanent magnet having at least a portion thereof disposed under a finger of a pole piece such that the permanent magnet supports the finger and is in turn supported by the other pole piece.

The present invention further provides an alternator. The alternator comprises a stator and a rotor rotatably mounted within the alternator across an air gap from the stator. The rotor further includes a first pole piece having a body defining an axis of rotation, and a plurality of pole fingers each having an axially-extending portion terminating in an end. In addition, the rotor comprises a second pole piece further having a body defining an axis of rotation coincident with the axis of the first pole piece, and a plurality of pole fingers each having an axially-extending portion terminating in an end. The pole fingers of the first pole piece are intermeshed with the pole fingers of the second pole piece. The rotor also includes a plurality of magnets, a plurality of magnets, each extending under an end of a finger of a pole piece and in contact with the finger, the magnets each having at least one surface facing radially outward from the rotor.

The present invention improves power output compared to a conventional alternator without necessarily increasing the size of the alternator. Further, the invention reduces airflow-caused acoustic noise within an alternator. An added advantage is that the present invention reduces magnetically-induced vibration of the rotor's pole fingers, further reducing acoustic noise. Those advantages are provided in a design which is durable and amenable to mass production.

DETAILED DESCRIPTION OF THE PREFERRED EMBODIMENT

Figure 1:
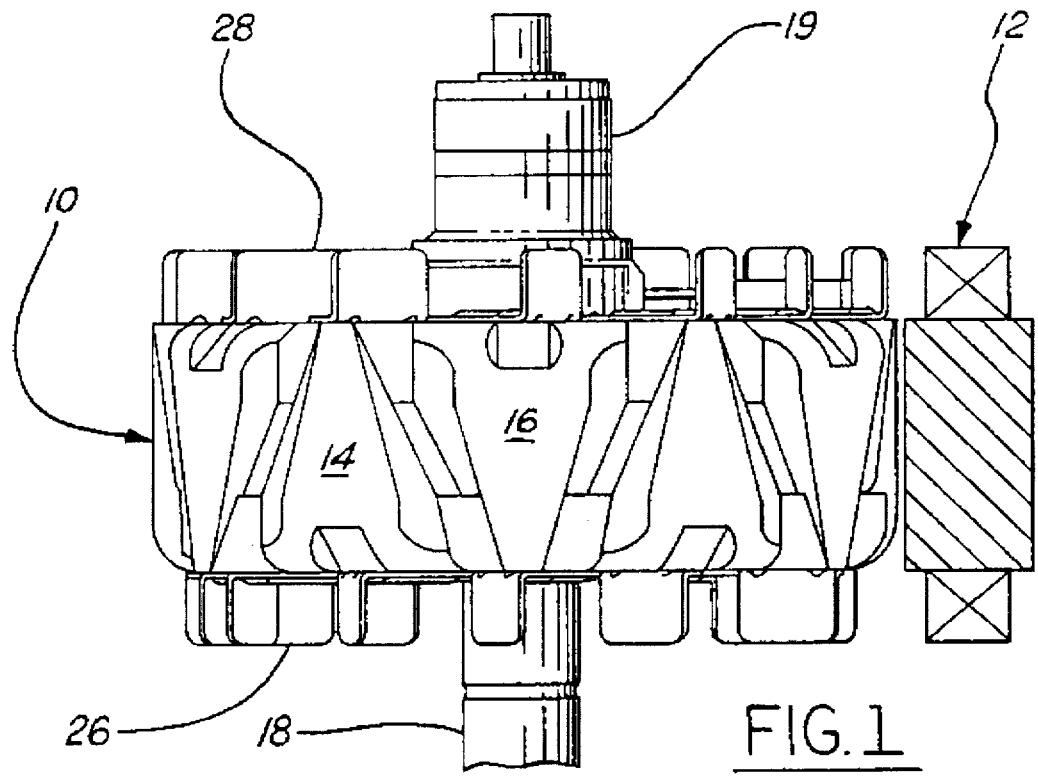
FIG. 1 is a side view, of rotor 10 and a partial cross-section of a stator 12 according to one embodiment of the present invention.
Figure 2:
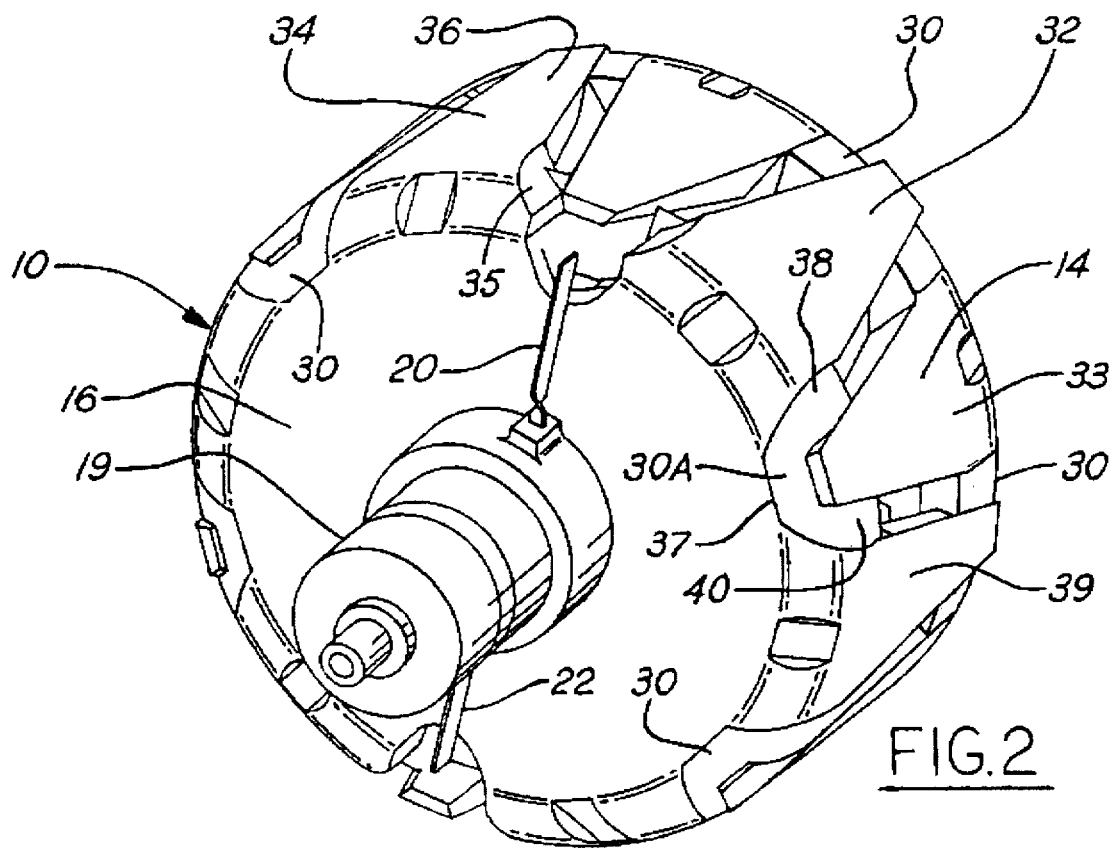
FIG. 2 is a perspective view of rotor 10 with fan 28 removed for clarity.
Figure 3:
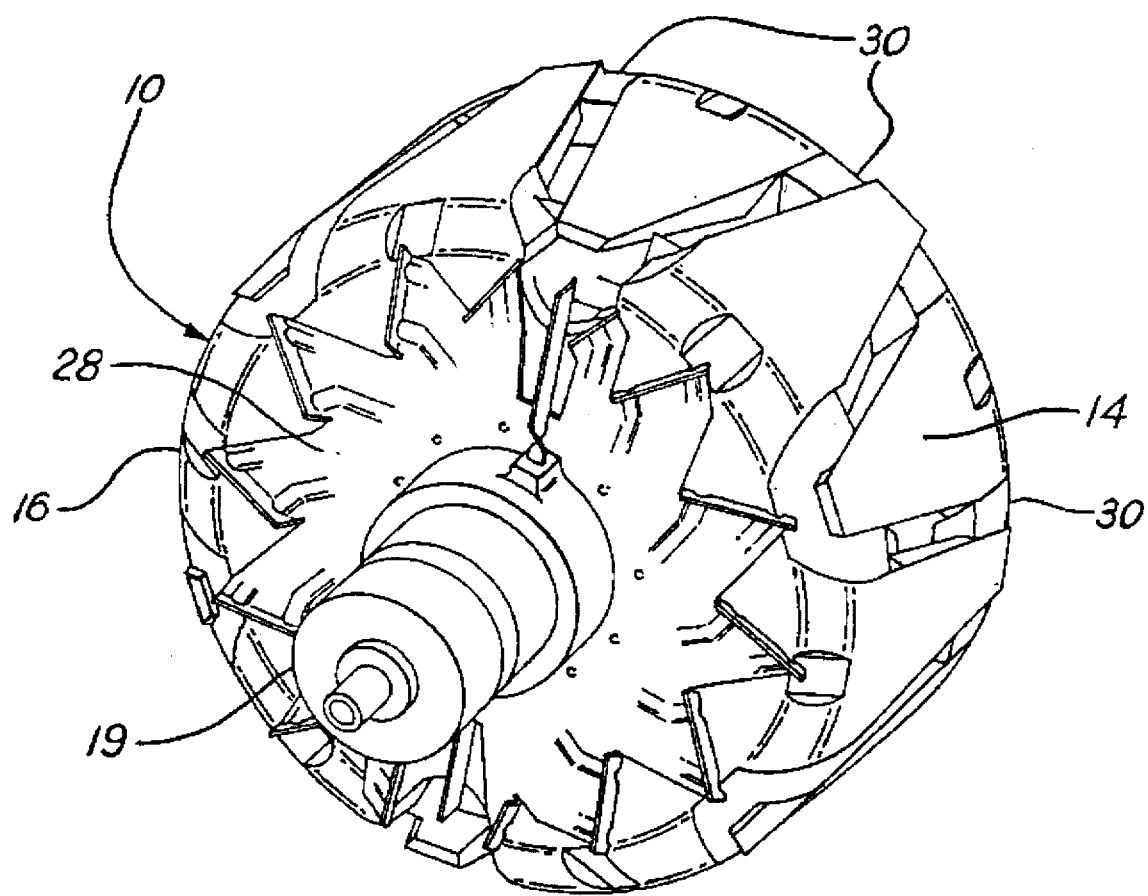
FIG. 3 is the perspective view of rotor 10 of FIG. 2 with fan 28 included.

Referring to FIGS. 1, 2 and 3, a rotor 10 and a portion of a stator 12 for an alternator according to one embodiment of the present invention are illustrated. Stator 12 is a conventional stator known in the art of alternators.

Rotor 10 comprises two pole pieces 14 and 16, mounted on shaft 18. One skilled in the art of electrical machines will recognize pole pieces 14 and 16 as pole pieces from a "claw pole" rotor. Mounted within pole pieces 14 and 16 is a field coil (not shown). Two wire ends (not shown) extend from the field coil and are welded to terminals 20 and 22 of slip ring 19. Slip ring 19 is mounted on shaft 18 for rotation therewith.

Coupled to the back of pole piece 14, preferably by welding, is a fan 26. Also, coupled to the back of pole piece 16 is a fan 28.

Rotor 10 also comprises magnetic inserts 30. Each magnetic insert 30 extends between two consecutive pole fingers of one pole piece and under the tip of a pole finger of the other pole piece. Further, each magnetic insert 30 preferably has two surfaces (for example, surfaces 38 and 40) which face radially outward from rotor 10. Each magnetic insert 30 is fixed against outward radial movement by the pole finger tip under which that magnetic insert 30 is located. Further, each magnetic insert 30 is fixed against axial movement by the appropriate fan 26 or 28. Fans 26 and 28 have at least some of their blades positioned so as to bear against the respective magnetic inserts 30 with which the fans are adjacent.

Figure 4:
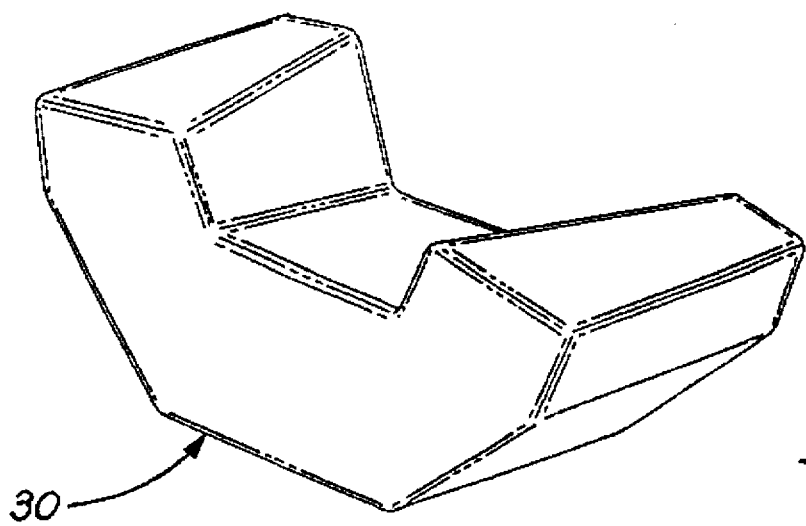
FIG. 4 is a perspective view of magnetic inserts 30 of FIGS. 1, 2 and 3.

Magnetic inserts 30 will now be more fully described with reference to FIG. 4. Magnetic inserts 30 are preferably made of permanent magnet material. Further, rare earth permanent magnet material is preferably used due to its superior magnetic qualities. However, other permanent magnet material such as ceramic permanent magnet material can also be used. In fact, a trade-off of cost versus performance in the design of a specific rotor 10 may lead a designer to choose a less expensive magnetic material than rare earth magnetic material. Magnetic insert 30 has a profile which allows it to fit under the tip of a pole finger of pole pieces 14 and 16.

If added toughness of magnetic inserts 30 is desirable to resist breakage of magnetic inserts 30 during assembly of rotor 10, magnetic inserts 30 can be overmolded with a non-magnetic material such as a polymer.

Rotor 10 can be assembled as follows (refer now to FIG. 1). Pole pieces 14 and 16 and the field coil assembly within them are mounted on shaft 18. The magnetic inserts 30 are then pressed into place from the sides of rotor 10. Finally, fans 26 and 28 are affixed to the backs of pole pieces 14 and 16, respectively, preferably by welding. As described above, magnetic inserts 30 are now fixed in place. It is apparent that this method of assembling rotor 10 is not a drastic departure from the assembly method of a conventional alternator rotor. As a result, the design of this embodiment of the present invention is amenable to mass production.

A number of alternate assembly methods for rotor 10 are possible. For example, other members than fans 26 and 28 can be attached to pole pieces 14 and 16 to bear against magnetic inserts 30 to prevent axial movement of magnetic inserts 30. As a further example, adhesive can be applied to magnetic inserts 30 to supplement the function of the fans or other members, or to altogether eliminate the requirement of the fans or other members to prevent axial movement of magnetic inserts 30.

If magnetic inserts 30 are made of permanent magnet material, it is preferable that they be magnetized after the above-described assembly of rotor 10 occurs. Magnetizing magnetic inserts 30 prior to assembly makes assembly of rotor 10 more difficult, and magnetic inserts 30 may tend to attract contaminants (metal shavings and the like). Post-assembly magnetization of magnetic inserts 30 can accomplished by using a magnetizing machine, with the pole pieces of the assembled rotor 10 being the flux path.

The orientation of the magnetization of magnetic inserts 30 is described with reference to FIG. 2. Each of the fingers of pole pieces 14 and 16 has a magnetic polarity (either north or south) when the field coil of rotor 10 is energized with current of the intended polarity. For example, finger 32 may be a south magnetic pole and finger 33 may be a north magnetic pole. Magnetic inserts 30 are preferably polarized such that the radially-outward portion of each magnetic insert 30 is of the same polarity as the polarity of the pole finger under which that magnetic insert 30 is located. For example, consider the case in which finger 33 is a north magnetic pole. Then, magnetic insert 30A will be magnetized such that its radially inward portion 37 is south and its radially outward portion (which comprises surfaces 38 and 40) is north.

With respect to regulation of the output voltage of an alternator comprising rotor 10, testing has suggested that a conventional voltage regulator can be used to control the field current of the alternator. That is, unidirectional current control (not bidirectional) in the field coil will likely suffice with the present invention. Testing has indicated that with no field current, there is very little output from the alternator, despite the considerable improvement in alternator output effected by magnetic inserts 30 when field current is applied. Because of the very small output of the alternator in the absence of field current, no bidirectional control of field current (to prevent output of the alternator from being too great at high alternator speeds) is expected to be necessary.

The present invention has been observed to have at least three performance advantages. First, the power output attainable from an alternator containing rotor 10 is significantly increased over an alternator of comparable physical size. Second, magnetic inserts 30 reduce acoustic noise associated with axial airflow through rotor 10. "12th-order" and "18th-order" noise have been observed to be significantly reduced in a rotor 10 according to one embodiment of the present invention. Third, magnetic inserts 30 provide support for the tips of the pole fingers (such as pole fingers 32 and 34) of rotor 10. Thus, the vibration of the tips of the pole fingers as rotor 10 rotates, due to magnetic attraction to stator 12 of the alternator (FIG. 1), is reduced. The result is a reduction in the acoustic noise associated with that vibration of the pole finger tips.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A rotor for an electrical machine, said rotor comprising:
  a first pole piece having a body defining an axis of rotation, and a plurality of pole fingers each having an axially-extending portion terminating in an end;
  a second pole piece further having a body defining an axis of rotation coincident with the axis of said first pole piece, and a plurality of pole fingers each having an axially-extending portion terminating in an end, the pole fingers of said first pole piece intermeshed with the pole fingers of said second pole piece; and
  a plurality of magnets, each extending under a said end of a said finger of a said pole piece and in contact with said finger, said magnets each having at least one surface facing radially outward from said rotor.

2. A rotor as recited in claim 1 wherein said magnets are permanent magnets.

3. A rotor as recited in claim 2, further comprising:
  a member mounted to said first pole piece, wherein said member has portions which impede axial movement of at least one of said permanent magnets.

4. A rotor as recited in claim 3, wherein said member is a fan.

5. A rotor as recited in claim 2, wherein said permanent magnets are adhesively bonded in place.

6. A rotor as recited in claim 2, wherein said permanent magnets each have a radially-outward portion and a radially-inward portion, said portions having opposite magnetic polarities.

7. A rotor as recited in claim 6, wherein each said magnet has two said surfaces facing radially outward, one said surface on each side of said finger under whose end said magnet is located.

8. A rotor as recited in claim 7, wherein said permanent magnets are rare earth permanent magnets.

9. A rotor as recited in claim 7, wherein said permanent magnets are ceramic permanent magnets.

10. A rotor as recited in claim 7, wherein said permanent magnets are overmolded with a non-magnetic material.

11. An alternator comprising:
   a stator;
   a rotor rotatably mounted within said alternator and across an air gap from said stator, said rotor further comprising:
      a first pole piece having a body defining an axis of rotation, and a plurality of pole fingers each having an axially-extending portion terminating in an end;
      a second pole piece further having a body defining an axis of rotation coincident with the axis of said first pole piece, and a plurality of pole fingers each having an axially-extending portion terminating in an end, the pole fingers of said first pole piece intermeshed with the pole fingers of said second pole piece; and
      a plurality of magnets, each extending under a said end of a said finger of a said pole piece and in contact with said finger, said magnets each having at least one surface facing radially outward from said rotor.

12. A rotor for an electrical machine, said rotor comprising:
   a first pole piece having a body defining an axis of rotation, and a plurality of pole fingers each having an axially-extending portion terminating in an end;
   a second pole piece further having a body defining an axis of rotation coincident with the axis of said first pole piece, and a plurality of pole fingers each having an axially-extending portion terminating in an end, the pole fingers of said first pole piece intermeshed with the pole fingers of said second pole piece; and
   a plurality of permanent magnets, each having at least a portion thereof disposed under a said end of a said finger of a said pole piece and in contact with said finger.

13. A rotor as recited in claim 12, wherein each said permanent magnet has a radially-outward portion and a radially-inward portion, said portions having opposite magnetic polarities.

14. A rotor for an electrical machine, said rotor comprising:
   a first pole piece having a body defining an axis of rotation, and a plurality of pole fingers each having an axially-extending portion;
   a second pole piece further having a body defining an axis of rotation coincident with the axis of said first pole piece, and a plurality of pole fingers each having an axially-extending portion, the pole fingers of said first pole piece intermeshed with the pole fingers of said second pole piece; and
   a plurality of permanent magnets, each permanent magnet having at least a portion thereof disposed under an end of a said finger of a said pole piece such that said permanent magnet supports said finger and is in turn supported by the other pole piece;
   wherein each said permanent magnet has a radially-outward portion and a radially-inward portion, said portions having opposite magnetic polarities.

* * * * *